3,194,666
STORAGE-STABLE AERATED ICINGS
William T. Bedenk, Greenhills, and Gordon F. Brunner, Springfield Township, Hamilton County, Ohio, and David R. Goodrich, Levittown, N.Y., assignors to The Procter & Gamble Company, Cincinnati, Ohio, a corporation of Ohio
No Drawing. Filed May 15, 1963, Ser. No. 280,734
11 Claims. (Cl. 99—139)

This invention relates to new and improved food products and, more particularly, to storage-stable aerated icings.

Icings are coatings which can be applied to cakes, sweet rolls, pastries and other baked goods. Although the basic ingredients of icings, as is well known, are sugar and water, the properties and characteristics of icings can be modified by variation of the constituents and additives used in connection wih the basic sugar and water.

Certain types of icings, generally known as cream or butter cream icings, contain a substantial proportion of fat or shortening and can be whipped to incorporate an appreciable volume of air. Although such icings initially have an attractive appearance and structure, they frequently are incapable of accommodating the desired amount of air for an extended storage time. That is, they tend to lose their smooth, uniform appearance and become ragged and filled with small holes or pockets as the air which is dispersed in the icing changes from an even distribution of very fine bubbles to an uneven distribution of coarse bubbles. Moreover, the conventional cream icings tend to be unstable at temperatures of about 90° F. even over relatively short periods of time whereby they slump or otherwise collapse with a consequent loss in volume and appearance.

Conventional aerated icings also have been found to be deficient in their resistance to storage conditions during normal retail shelf-life. That is, they tend to lose desirable aeration properties even when packed in sealed containers. This instability has made it impracticable to attempt to market in commercial channels a ready-to-use prepared cream icing.

An object of the present invention is the preparation of a storage-stable fat-containing icing having improved air retention properties.

Another object is the preparation of a shortening which will impart stability to a packaged icing and cause the icing to retain a fine dispersion of a large volume of air or other gas over long periods of time without hardening or without loss of its smooth spreadability.

A further object is the preparation of a cream icing which is stable toward slump, bleeding of oil, and collapse while on a cake or other baked product.

A still further object is the preparation of a ready-to-use cream icing that is resistant to microbial spoilage for extended periods of storage time in sealed containers.

It has been discovered according to this invention that excellent air retention and storage-stability of cream icings is obtained by incorporating therein a specially compounded shortening having certain definite properties. This finding is in distinct contrast to the approach of other technologists in the cream icing field who have been concerned primarily with the use of various minor additives of one sort or another rather than with the particular type or structure of the basic fat or shortening incorporated in the icing. Thus, most icing formulae of the fat-containing type call for the use of shortening or various other fatty materials with little or no attention being given to the chemical or physical structure of the fat required. The fats and shortenings usually suggested for icing preparation are butter, margarine, or the conventional partially hydrogenated fats and oils which are commercially sold for general purpose frying and baking.

As is well known in the art, the conventional partially hydrogenated shortenings have a dominant beta-prime crystalline phase as distinguished from an alpha- or beta-phase. These types of polymorphic crystalline structures of fats can be identified by their X-ray diffraction patterns and are described in U.S. Patents 2,521,242–2, granted to Paul J. Mitchell, Jr., September 5, 1950. Many of the ordinary glyceride fats can be crystallized in one or more of these forms which generally depends upon the particular processing treatment to which they are subjected.

In the co-pending application of Bedenk and Dobson, U.S. Serial No. 280,731, filed May 15, 1963, there is disclosed a storage-stable non-firming icing comprising sugar, water, and shortening, which employs in the icing a beta-phase plastic shortening comprising partially hydrogenated glyceride base stock and substantially completely hydrogenated triglyceride beta-phase-tending hardstock. The icing remains soft and spreadable after extended periods of storage time.

It has now been found that the aeration characteristics of an icing of the type disclosed in the above-mentioned co-pending application can be substantially improved by the employment of certain selected combinations of hardstocks in the shortening component of the icing.

In general, the icing of this invention comprises sugar, water, and shortening. The shortening comprises essentially, by weight of the shortening, from about 55% to about 75% base stock of partially hydrogenated glyceride having an iodine value of from about 50 to about 110 and from about 25% to about 45% substantially completely hydrogenated triglyceride hardstock having an iodine value not exceeding about 12, said substantially completely hydrogenated triglyceride consisting essentially of beta-phase-tending hardstock and non-beta-phase-tending hardstock in a ratio by weight of from about 9:1 to about 1:1, and at least about 70% of the shortening solids being in a beta-phase. From about 5% to about 50%, by volume of the icing, of an edible gas in finely divided form is substantially uniformly incorporated in the icing.

As used herein, the term "plastic" shortening is meant to define a solid, non-fluid, non-pourable, and non-pumpable shortening at room temperature (70° F. to 100° F.). Said shortening must have a yield point high enough to prevent product flow at room temperature, that is, it must not only be sufficiently solid to prevent product deformation under its own weight in ordinary commercial unit quantities, but also be non-pumpable with ordinary commercial pumps which are conventionally used for pumping liquids or fluids at room temperature. In order to satisfy these conditions, the shortening must have substantial interlacing of crystalline particles of very small size.

The base stock of the shortening is a partially hydrogenated glyceride which can be derived from animal, vegetable, or marine sources including naturally-occurring triglyceride oils and fats such as cottonseed oil, soybean oil, peanut oil, olive oil, palm oil, corn oil, rapeseed oil, safflower oil, sesame seed oil, sunflower seed oil, sardine oil, lard, tallow and the like. A preferred base stock is partially hydrogenated soybean oil having an iodine value of from about 75 to about 95.

Other suitable base stock glycerides having the herein defined iodine values for use in this invention can be derived from natural or synthetic fats and oils containing long-chain acyl groups in the glyceride molecule of from about 12 to about 24 carbon atoms such as lauroyl, lauroleoyl, myristoyl, myristoleoyl, palmitoyl, palmitoleoyl, stearoyl, oleoyl, ricinoleoyl, linoleoyl, linolenoyl, elaidoyl, arachidoyl, gadoleoyl, arachidonoyl, behenoyl, erucoyl, brassidoyl, clupadonoyl, lignoceroyl, and/or selacholeoyl. A portion of the base stock glycerides also can contain in the molecule one or two short-chain acyl groups having from 2 to about 6 carbon atoms such as acetyl, propanoyl, butanoyl, pentanoyl, and hexanoyl. Suitable base stock also can be derived from randomly and low-temperature rearranged fatty triglyceride-containing oils and fats such as rearranged cottonseed oil and lard.

Suitable partial hydrogenation of liquid triglyceride oil to form the base stock of this invention can be carried out by conventional methods and usually consists of a batch process whereby the oil is contacted with hydrogen in the presence of nickel catalyst. It is preferable to hydrogenate the oil until it has an iodine value of from about 50 to about 110. Various triglyceride fats and oils, such as lard, tallow, olive oil, and peanut oil, which normally have iodine values within this range will require little or no additional hydrogenation.

The iodine value (I.V.) of an oil or fat indicates the number of grams of iodine equivalent to the halogen absorbed by a 100 gram sample. In general, the lower the iodine value of a given fat or oil, the greater will be its content of solids. That is, as the triglyceride molecule becomes more saturated by the addition of hydrogen (or its double bond availability decreases), its consistency becomes more solid. The iodine value can be readily determined by the well-known Wijs method.

A reasonably accurate approximation of the percent by weight of solids in a sample of fat or oil at any given temperature can be determined dilatometrically by a method described in 31, J. Am. Oil Chemists Society, 98–103 (March 1954). The approximation of the solids content of the sample according to this method is stated in terms of a solids content index (S.C.I.). The above-described range of iodine value of from about 50 to about 110 for the partially hydrogenated glyceride base stock of this invention corresponds approximately to a range of solids content index of from about 0 to about 75 at 70° F.

The substantially completely hydrogenated triglyceride hardstock of the shortening should have an iodine value not greater than about 12. The hardstock must be formed to consist essentially of beta-phase-tending hardstock and non-beta-phase-tending hardstock in a ratio by weight of from about 9:1 to about 1:1, and preferably in a ratio of 6:1 to 2:1.

Examples of beta-phase-tending triglyceride hardstocks which can be used in the practice of this invention are tristearin, tripalmitin, and symmetrical palmitodistearin. Other suitable triglyceride hardstocks having strong beta-forming tendencies can be derived from substantially completely hydrogenated fats and oils such as lard, sunflower seed oil, safflower seed oil, linseed oil, sesame seed oil, hazelnut oil, soybean oil, peanut oil, olive oil, and corn oil. A preferred beta-phase-tending triglyceride hardstock component is substantially completely hydrogenated soybean oil having an iodine value of about 8.

The preferred non-beta-phase-tending hardstock component of the shortening is substantially completely hydrogenated rapeseed oil. This material tends to crystallize in the beta-prime phase. Unexpectedly, it has been found to give superior air incorporation properties and air retention stability to icings without preventing transformation of shortening to beta-phase when used in combination with beta-phase-tending hardstock in the above-described shortening in the aforesaid proportions. Other non-beta-phase-tending hardstocks which can be used in the practice of this invention with substantially equivalent results are substantially completely hydrogenated cottonseed oil and substantially completely hydrogenated fats and oils having a high proportion of fatty acids containing 20 to 24 carbon atoms such as mustard seed oil, salmon oil, herring oil, pilchard oil, menhaden oil, and sardine oil.

The partially hydrogenated glyceride base stock and substantially completely hydrogenated triglyceride hardstock can be combined to form the plastic shortening of this invention by various means whereby the hardstock component is substantially in a beta-phase crystalline form of very small particle size. One method of forming a beta-phase plastic shortening is described in U.S. Patent 2,801,177, granted to Edwin S. Lutton, July 30, 1957. This method can be used in the practice of this invention provided that the aforesaid proportions of base stock to hardstock and beta-phase-tending hardstock to non-beta-phase-tending hardstock are met and a higher tempering temperature is used, i.e., on the order of about 110° F. to about 120° F. in order to form a substantial interlacing of beta-phase crystalline particles of very small size.

A preferred method of forming the beta-phase plastic shortening of this invention comprises forming a completely melted mixture of the base stock and hardstock in the above-described proportions. This generally can be accomplished by heating to a temperature in excess of about 150° F. The melted oil mixture then is pumped through a scraped wall heat exchanger in which the oil is rapidly chilled to a temperature of from about 70° to about 90° F. A suitable device for this purpose, referred to as a freezer or "Votator," is described in U.S. Reissue Patent No. 21,406, granted to Clarence W. Vogt, March 19, 1940. From this heat exchanger, the chilled supercooled mixture is pumped into containers where the shortening substantially completes its crystallization. Transformation of the shortening solids to beta-phase then takes place at rest in a tempering room which is held at a temperature of from about 110° to about 120° F. Within a period of about 12 hours after the shortening reaches 110° F., its crystalline structure is converted to predominantly beta-phase crystals. That is, both the beta-phase-tending and non-beta-phase-tending solids will be converted to predominantly beta-phase crystals (70% or greater). Shortening prepared in the above manner will be plastic and have a substantial interlacing of crystalline particles of very small size.

The shortening prepared in the foregoing manner can be used to form an excellent storage-stable aerated icing of the type comprising sugar, water, and fat. Although this shortening is formed so that it is particularly adaptable to such aerated icings, it can also be used for other purposes in which case one or more of the conventional shortening emulsifiers preferably are incorporated therein. For example, the ordinary mono-, and diglycerides of the higher fatty acids, such as mono- and distearin, and mono- and diolein, can be used as ingredients for ordinary emulsifying purposes in the shortening of this invention. It is preferable for icing purposes to include in the shortening from about 2.5% to about 5%, by weight, of a mixture of mono- and diglycerides of partially hydrogenated soybean oil having an iodine value of from about 75 to about 80.

Various other additives can be used in the shortening or icing of this invention provided that they are edible and aesthetically desirable. It will be recognized, however, that the presence of other additives may have an adverse effect upon the stabilizing properties of the shortening of this invention, and therefore, the desirability of the use of other additives will depend upon the overall shortening and icing qualities desired. Certain common shortening and icing additives such as the higher fatty acid esters of sucrose, sorbitol, sorbitan, polyoxyethylene, and polyoxyethylene sorbitan; lactic and/or citric acid esters of mono- and/or diglycerides or of other higher fatty acid-containing polyol partial esters; propylene glycol monostearate; and the like materials are compatible with the beta-phase shortening and the icing of this invention and can be incorporated therein if desired. In particular, from about 2% to about 6%, by weight of the shortening, of polyoxyethylene sorbitan mono-stearate has been found to be useful for improving the texture and sheen of the icing.

Other ingredients such as flavoring; coloring; conventional acidifying agents, such as citric, acetic and phosphoric acids; sodium chloride and other salts; dextrose and other sugars; antioxidants, such as butylated hydroxytoluene, butylated hydroxyanisole, citric acid, and methyl silicone; and conventional mold inhibitors, such as sorbic acid, potassium sorbate, dehydroacetic acid, and sodium benzoate also can be added to the shortening or icing of this invention, if desired.

It is preferable to use sorbic acid as a microbial inhibitor in the icing of this invention at a concentration ranging from about 0.05% to about 0.15%, by weight, and to adjust the pH of the icing to about 4.5 to 6.0 with a minor amount of an edible acid such as acetic, citric, or phosphoric acid. It has been found that such use of sorbic acid provides excellent stability against microbial spoilage of the packaged icing for periods in excess of 52 weeks when the sealed containers are stored at room temperature (70° F. to 100° F.). The use of sorbic acid, potassium sorbate, and sodium benzoate as inhibitors of growth of micro-organisms in sundry food products is described in U.S. Patent 2,379,294, granted to Chester M. Gooding, June 26, 1945. The use of sodium benzoate and citric acid in an icing is described in U.S. Patent 2,353,307, granted to Julian A. Joffe, July 11, 1944.

In preparing the icing of this invention it is preferable first to dissolve a small amount of hydrophilic colloid in water to form an aqueous stabilizer base and then add thereto the other icing ingredients, except shortening, to form a fondant. As used herein, the term "fondant" is meant to define a mixture of fine particles of sucrose in saturated sucrose syrup which can contain other ingredients of the icing except the shortening. The other ingredients generally include sugar, salt, and flavoring materials.

Suitable hydrophilic colloids are Irish moss and carragheen gum, locust bean gum, alginates, agar-agar, gelatin, and water-soluble cellulose ethers such as methyl cellulose, sodium carboxymethyl cellulose and the like. These colloidal materials assist the formation of a smooth dispersion of various other ingredients in the icing. They are preferably used in amounts of from about 0.05% to about 2%, by weight of the icing. The other ingredients of the fondant, which consist primarily of sugar, salt, and flavoring materials, can be conveniently mixed into the aqueous component with a Hobart paddle-type mixer.

When the ingredients of the fondant are blended together, the plastic shortening component can be added and mixed in with a turbine agitator to form a homogeneous icing. During or after the latter mixing, a substantial portion of air, nitrogen, nitrous oxide, carbon dioxide, octafluorocyclobutane, or other edible gas is beaten into the icing in finely divided form in an amount of from about 5% to about 50% by volume of the icing.

In order to form a smooth, soft, homogeneous icing with the shortening having the high hardstock content (25% to 45%), it is preferable to subject the shortening to intensive high shear mixing prior to its incorporation in the fondant. The high shear mixing mechanically breaks up the crystal matrix to give a fine structure in the shortening whereby it can be readily dispersed in the fondant to form a smooth, creamy icing. This can be accomplished by passing the shortening through a centrifugal pump or by means of hammermills, colloid mills, and other devices to impart high shear.

It is preferable to incorporate the sugar, water, and shortening in the icing formula in proportions as to satisfy the condition that the icing comprises, by weight, from about 45% to about 75% sugar, from about 10% to about 25% water, and from about 5% to about 30% shortening.

The following examples illustrate the shortening and icing compositions of this invention, but the invention is not limited to these specific examples.

Example 1

An icing was prepared from ingredients as follows:

| Ingredients: | Percent by weight |
|---|---|
| Water | 18.50 |
| Carragheen gum (Irish moss) | 0.09 |
| Powdered sugar (sucrose) | 52.01 |
| Dextrose | 4.50 |
| Sodium chloride | 0.30 |
| Sorbic acid | 0.10 |
| Non-fat dry milk solids | 2.30 |
| Cocoa | 7.00 |
| Flavoring | 0.06 |
| 50% aqueous citric acid solution | 0.14 |
| Shortening | 15.00 |
| | 100.00 |

The carragheen gum was dispersed in the water at room temperature and the mixture was heated to about 145° F. to form an aqueous stabilizer base for the icing. A fondant was prepared by slowly adding the dry ingredients (sucrose, dextrose, sodium chloride, sorbic acid, milk solids, and cocoa) to the aqueous stabilizer base and mixing until a homogeneous blend was formed. The remaining liquid ingredients (citric acid solution and coloring) were then added and blended into the fondant. A smooth icing having an attractive sheen was prepared from this fondant by mixing therein with a turbine agitator, at a processing temperature of about 110° F., a specially compounded plastic shortening having the following composition:

| Ingredients: | Percent by weight |
|---|---|
| Base stock (refined, bleached soybean oil partially hydrogenated to an iodine value of about 85 and a solids content index of 11 at 70° F.) | 58 |
| Hardstock (substantially completely hydrogenated soybean oil and substantially completely hydrogenated rapeseed oil in a weight ratio of 2½:1 and having an iodine value of 8) | 35 |
| Mono- and diglycerides of partially hydrogenated soybean oil having an iodine value of about 80 | 4 |
| Polyoxyethylene sorbitan monostearate ("Tween 60") | 3 |

The above shortening component of the icing was formed by melting a mixture of the base stock and hardstock by heating to a temperature slightly in excess of about 150° F. The melted oil mixture was pumped through a scraped wall heat exchanger ("Votator") in which the oil was rapidly chilled to a temperature of about 85° F. The chilled supercooled mixture which issued from the refrigerated heat exchanger was pumped into containers (50 pound size cubes, polyethylene lined) and allowed to crystallize substantially completely. The containers with the substantially completely crystallized shortening were placed in a constant temperature room having a temperature of about 120° F. The shortening was allowed to remain in this room at rest for a period of about 12 hours after it reached a temperature of 110° F., during which time the solid phase of the shortening was converted to predominantly (greater than 70%) beta-phase crystals as determined by X-ray diffraction patterns.

The above processed shortening was blended into the hereinbefore-described fondant to form an icing which then was aerated, while mechanically whipping, with nitrogen gas in an amount of about 15%, by volume of the icing, whereby an icing density of 1.13 g./cc. was achieved. The icing pH was about 5.

The air dispersion stability of the icing was excellent as determined by the paucity of holes or pockets of agglomerated air bubbles formed on the surface of said icing when spread on a flat surface with a single stroke of a knife in one direction after having been stored in a sealed metal container under atmospheric pressure for six weeks at temperatures of 70° F. and 100° F.

The stored icing also had excellent peak and very little slump. The peaking was shown by the ability of the icing to form well-defined sharp points on a cake surface by a lifting motion with a knife or spatula. The slump qualities of the icing were shown by the ability of the icing to hold its shape on a vertical surface without appreciable sagging for a period of 30 minutes at 100° F.

The above-described air dispersion stability, peak, and slump properties are desirable characteristics of a packaged, ready-to-use, prepared icing that requires no refrigeration during storage.

*Example 2*

An icing was prepared from ingredients as follows:

| Ingredients: | Percent by weight |
|---|---|
| Water | 12.00 |
| Carragheen gum | 0.09 |
| Powdered sugar | 74.19 |
| Dextrose | 4.50 |
| Sodium chloride | 0.50 |
| Potassium sorbate | 0.13 |
| 50% aqueous citric acid solution | 0.04 |
| Shortening | 8.05 |
| Polyoxyethylene sorbitan monostearate ("Tween 60") | 0.45 |
| | 100.00 |

The icing was prepared according to the procedure described in Example 1 except that the shortening was mixed into the fondant at a processing temperature of about 100° F. and consisted of the following ingredients:

| Shortening ingredients: | Percent by weight |
|---|---|
| Base stock (refined, bleached soybean oil partially hydrogenated to an iodine value of about 85 and a solids content index of 11) | 65 |
| Hardstock (substantially completely hydrogenated soybean oil and substantially completely hydrogenated rapeseed oil in weight ratios as shown in the table below) | 35 |
| | 100 |

The table below shows the viscosity and stability of the air dispersion of five icings prepared in the above manner and having the described proportions of soybean to rapeseed hardstocks in the shortening component.

| Weight Ratio of Soybean Hardstock to Rapeseed Hardstock | Initial 70° F. Brookfield Viscosity Reading | Increase in Viscosity, 6 Weeks at 100° F. | Air Dispersion Stability Grade, 6 Weeks at 100° F. | Icing appearance, 6 Weeks at 100° F. |
|---|---|---|---|---|
| All Soybean Hardstock | 40 | 0 | 4 | Soft, but full of small undesirable holes and air pocks. |
| 6:1 | 38 | 4 | 6 | Soft, smooth. |
| 2½:1 | 37 | 15 | 8 | Do. |
| 1½:1 | 38 | 26 | 8 | Do. |
| All Rapeseed Hardstock | 27 | 60 | 9 | Excessive firming and hardening. |

The above aging measurements were made after six weeks' storage of the icing in a sealed metal container under atmospheric pressure.

The viscosity of the icings before and after aging was determined with a Brookfield Synchro-lectric Viscometer Model RVT ½ using the F spindle and a spindle speed of 5 r.p.m. The viscosity was measured after returning the icing samples to 70° F. The viscosity is a measure of the internal friction of the icing and indicates the resistance to change of form.

The air dispersion stability of the icing was determined subjectively through blind scorings by an expert panel on a rating scale of 1 to 10. The above air dispersion stability rating of 4 is unacceptable; 6 is fair; 8 is good; 9 is very good; and 10 is excellent. Although the "all rapeseed" hardstock icing had a very good air dispersion stability, it was undesirable because of its excessive firming, hardening and increase in viscosity.

The above-described viscosity and air dispersion stability properties and the soft, smooth appearance and spreadability of the icings containing the hardstock blends of this invention are desirable characteristics of a packaged, ready-to-use, prepared icing.

*Example 3*

Three aerated icings were prepared in accordance with the procedure and formula of Example 2 except that the amount of shortening in the icing was adjusted at the expense of the powdered sugar as shown in the table below. The shortening hardstock weight ratio of substantially completely hydrogenated soybean to rapeseed oils was 6:1. Aging measurements were made in accordance with the procedures described in Example 2 after 26 days' storage of the icing in a sealed metal container under atmospheric pressure.

| Weight Percent Shortening | Increase in Viscosity, 26 days at 100° F. | Air Stability Grade, 26 days at 100° F. |
|---|---|---|
| 10.5 | 5 | 8.5 |
| 12.5 | 5 | 9.5 |
| 14.5 | 3 | 9.5 |

The above icings had excellent eating qualities and were stable toward slump and bleeding of oil when spread on a cake after the described storage period.

When other beta-phase-tending hardstocks such as tristerin, tripalmitin, and symmetrical palmitodistearin are substituted for the substantially completely hydrogenated soybean oil, and other non-beta-phase-tending hardstocks such as substantially completely hydrogenated mustard seed oil, herring oil and pilchard oil are substituted for the rapeseed oil hardstock in the above examples in ratios of from about 9:1 to about 1:1 (beta-phase-tending hardstock to non-beta-phase-tending hardstock), comparable aerated, storage-stable icings are obtained. Other base stocks, such as partially hydrogenated cottonseed oil having an iodine value of about 100 and a solids content index of about 0 to 3 at 70° F. and partially hydrogenated corn oil having an iodine value of about 60 and a solids content index of about 55 to 60 at 70° F., can be substituted for the partially hydrogenated soybean oil base stock in the above examples with substantially equal results.

What is claimed is:

1. An aerated, storage-stable icing comprising a mixture of sugar, water and shortening, said shortening comprising esesntially, by weight of the shortening, from about 55% to about 75% partially hydrogenated glyceride base stock having an iodine value of from about 50 to about 110 and from about 25% to about 45% substantially completely hydrogenated triglyceride hardstock having an iodine value not exceeding about 12, said substantially completely hydrogenated triglyceride consisting essentially of beta-phase-tending hardstock and non-beta-phase-tending hardstock in a ratio by weight of from about 9:1 to about 1:1, at least about 70% of the shortening solids being in a beta-phase, said icing having substantially uniformly incorporated therein from about 5% to about 50%, by volume of said icing, of an edible gas in finely divided form.

2. The icing of claim 1 in which the base stock is partially hydrogenated soybean oil having an iodine value of from about 75 to about 95.

3. The icing of claim 1 in which the beta-phase-tending hardstock is substantially completely hydrogenated soybean oil.

4. The icing of claim 1 in which the non-beta-phase-tending hardstock is substantially completely hydrogenated rapeseed oil.

5. An aerated, storage-stable icing comprising a mixture of sugar, water, and shortening, said shortening comprising essentially, by weight of the shortening, from about 55% to about 75% partially hydrogenated soybean oil having an iodine value of from about 75 to about 95 and from about 25% to about 45% substantially completely hydrogenated triglyceride hardstock consisting essentially of substantially completely hydrogenated soybean oil and substantially completely hydrogenated rapeseed oil in a ratio by weight of from about 9:1 to about 1:1, at least about 70% of the shortening solids being in a beta-phase, said icing having substantially uniformly incorporated therein from about 5% to about 50%, by volume of said icing, of an edible gas in finely divided form.

6. The icing of claim 5 in which the ratio by weight of soybean oil hardstock to rapeseed oil hardstock is 6:1 to 2:1.

7. An aerated, storage-stable icing comprising, by weight of the icing, from about 45% to about 75% sugar, from about 10% to about 25% water, and from about 5% to about 30% shortening, said shortening comprising essentially, by weight of the shortening, from about 55% to about 75% partially hydrogenated glyceride base stock having an iodine value of from about 50 to about 110 and from about 25% to about 45% substantially completely hydrogenated triglyceride hardstock having an iodine value less than about 12, said substantially completely hydrogenated triglyceride consisting essentially of beta-phase-tending hardstock and non-beta-phase-tending hardstock in a ratio by weight of from about 9:1 to about 1:1, at least about 70% of the shortening solids being in a beta-phase, said icing having substantially uniformly incorporated therein from about 5% to about 50%, by volume of said icing, of an edible gas in finely divided form.

8. An aerated, storage-stable icing comprising by weight of the icing, from about 45% to about 75% sugar, from about 10% to about 25% water and from about 5% to about 30% shortening, said shortening comprising essentially, by weight of the shortening, from about 55% to about 75% partially hydrogenated soybean oil having an iodine value of from about 75 to about 95 and from about 25% to about 45% substantially completely hydrogenated triglyceride hardstock consisting essentially of substantially completely hydrogenated soybean oil and substantially completely hydrogenated rapeseed oil in a ratio by weight of from about 9:1 to about 1:1, at least about 70% of the shortening solids being in a beta-phase, said icing having substantially uniformly incorporated therein from about 5% to about 50%, by volume of said icing, of an edible gas in finely divided form.

9. The icing of claim 8 in which the ratio by weight of soybean oil hardstock to rapeseed oil hardstock is 6:1 to 2:1.

10. An aerated, storage-stable icing comprising, by weight of the icing, from about 45% to about 75% sugar, from about 10% to about 25% water, from about 5% to about 30% shortening, from about 0.05% to about 2% hydrophilic colloid, and from about 0.05% to about 0.15% sorbic acid, said shortening comprising essentially, by weight of the shortening, from about 55% to about 75% partially hydrogenated soybean oil having an iodine value of from about 75 to about 95, from about 25% to about 45% substantially completely hydrogenated triglyceride hardstock, from about 2% to about 6% polyoxyethylene sorbitan monostearate, and from about 2.5% to about 5% mono- and diglycerides of partially hydrogenated soybean oil having an iodine value of from about 75 to about 80, said substantially completely hydrogenated triglyceride hardstock consisting essentially of substantially completely hydrogenated soybean oil and substantially completely hydrogenated rapeseed oil in a ratio by weight of 6:1 to 2:1, at least about 70% of the shortening solids being in a beta-phase, said icing having substantially uniformly incorporated therein from about 5% to about 50%, by volume of said icing, of an edible gas in finely divided form and having a pH of from about 4.5 to about 6.0.

11. A process of preparing an aerated, storage-stable icing comprising sugar, water, and shortening, which method comprises: forming a fluid uniform mixture, by weight of the shortening, of from about 55% to about 75% partially hydrogenated glyceride base stock having an iodine value of from about 50 to about 110 and from about 25% to about 45% substantially completely hydrogenated triglyceride hardstock having an iodine value less than about 12, said substantially completely hydrogenated triglyceride consisting essentially of beta-phase-tending hardstock and non-beta-phase-tending hardstock in a ratio by weight of from about 9:1 to about 1:1, chilling said mixture to a temperature below the solidification point of the hardstock component; converting the solid phase of the mixture at rest to a beta-phase to such an extent that at least about 70% of the shortening solids are beta-phase crystals; substantially uniformly blending the shortening with the non-shortening ingredients; and substantially uniformly incorporating into the blend thus produced an edible gas in finely divided form in an amount of from about 5% to about 50% by volume of said icing.

References Cited by the Examiner

UNITED STATES PATENTS

| | | | |
|---|---|---|---|
| 2,598,282 | 5/52 | Melnick | 99—139 |
| 2,801,177 | 7/57 | Lutton | 99—118 |
| 3,102,814 | 9/63 | Thompson | 99—118 |
| 3,132,951 | 5/64 | Thompson | 99—118 |

FOREIGN PATENTS 810,278   3/59   Great Britain.

A. LOUIS MONACELL, *Primary Examiner.*